(12) United States Patent
Gandhe et al.

(10) Patent No.: US 9,569,530 B2
(45) Date of Patent: Feb. 14, 2017

(54) EXTRACTING AND MINING OF QUOTE DATA ACROSS MULTIPLE LANGUAGES

(71) Applicant: International Business Machines Corporation, Armonk, NY (US)

(72) Inventors: Ankur Gandhe, Bangalore (IN); Amit Kumar R. Singh, Mumbai (IN); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 14/077,672

(22) Filed: Nov. 12, 2013

(65) Prior Publication Data
US 2015/0134656 A1 May 14, 2015

(51) Int. Cl.
*G06F 17/30* (2006.01)

(52) U.S. Cl.
CPC ... *G06F 17/30716* (2013.01); *G06F 17/30669* (2013.01); *G06F 17/30719* (2013.01)

(58) Field of Classification Search
None
See application file for complete search history.

(56) References Cited

U.S. PATENT DOCUMENTS

| | | | |
|---|---|---|---|
| 7,558,778 | B2 | 7/2009 | Carus et al. |
| 7,596,552 | B2 | 9/2009 | Levy et al. |
| 7,949,514 | B2 | 5/2011 | Pacull |
| 2010/0050118 | A1 | 2/2010 | Chowdhury et al. |
| 2010/0076746 | A1 | 3/2010 | Aikawa et al. |
| 2011/0246181 | A1 | 10/2011 | Liang et al. |
| 2013/0073336 | A1* | 3/2013 | Heath ............ G06Q 30/02 705/7.29 |
| 2013/0159340 | A1 | 6/2013 | Blanco et al. |
| 2013/0263019 | A1* | 10/2013 | Castellanos ........ G06Q 50/01 715/753 |

(Continued)

FOREIGN PATENT DOCUMENTS

| | | |
|---|---|---|
| JP | 2011108053 A | 6/2011 |
| JP | 2013196261 A | 9/2013 |

OTHER PUBLICATIONS

Denecke, Kerstin, et al. "Topic-related Sentiment Analysis for Discovering Contradicting Opinions in Weblogs." (2009).*

(Continued)

*Primary Examiner* — William Spieler
(74) *Attorney, Agent, or Firm* — Brandon C. Kennedy; Feb Cabrasawan; Kennedy Lenart Spraggins LLP

(57) ABSTRACT

Extracting and mining of quote data across multiple languages, including: retrieving, from a plurality of quote sources, a plurality of commentary summarizations, wherein each commentary summarization is embodied as a machine-readable data structure and wherein the plurality of commentary summarizations include information in at least two or more languages; for each commentary summarization: identifying, within the commentary summarization, quote data, wherein the quote data represents a quote from a commentator; creating a quote tuple for the quote data, the quote tuple including information associated with quantifiable aspects of the quote data; and storing, in a quote tuple repository, the quote tuple; mining, for quote analysis information, the quote tuple repository; and presenting, to a user, the quote analysis information.

9 Claims, 5 Drawing Sheets

(56) References Cited

U.S. PATENT DOCUMENTS

| | | | | |
|---|---|---|---|---|
| 2013/0290232 | A1* | 10/2013 | Tsytsarau | G06N 99/005 706/46 |
| 2014/0125757 | A1* | 5/2014 | Lee | H04N 7/141 348/14.07 |
| 2014/0189536 | A1* | 7/2014 | Lange | H04L 67/22 715/753 |
| 2015/0066968 | A1* | 3/2015 | Bastide | G06F 17/30386 707/758 |
| 2015/0106360 | A1* | 4/2015 | Cao | G06F 17/30716 707/723 |

OTHER PUBLICATIONS

Worsley, Marcelo, and Paulo Blikstein. "What's an Expert? Using learning analytics to identify emergent markers of expertise through automated speech, sentiment and sketch analysis." Educational Data Mining 2011. 2010.*

Pouliquen, Bruno, et al. "Multilingual and cross-lingual news topic tracking." Proceedings of the 20th international conference on Computational Linguistics. Association for Computational Linguistics, 2004.*

Bar-Haim, Roy, et al. "Identifying and following expert investors in stock microblogs." Proceedings of the Conference on Empirical Methods in Natural Language Processing. Association for Computational Linguistics, 2011.*

Ennals, Rob, Beth Trushkowsky, and John Mark Agosta. "Highlighting disputed claims on the web." Proceedings of the 19th international conference on World wide web. ACM, 2010.*

Cohen, R. (May 15, 2003). Sharon's Double Talk. The Washington Post.*

PCT Search Report and Written Opinion, Dec. 9, 2014, PCT Application No. PCTJP2014004731, 8 pages.

Velcin et al., "Contributions to Topic Extraction and Tracking", www.cros-portal.eu, Mar. 24, 2011 [online publication], 9 pp., URL: http://www.cros-portal.eu/sites/default/files/S1P2.pdf.

Ehrmann et al., "Building a Multilingual Named Entity-Annotated Corpus Using Annotation Projection", Proceedings of the International Conference Recent Advances in Natural Language Processing, Sep. 2011, pp. 118-124, RANLP 2011 Organising Committee, Hissar, Bulgaria.

Alonso et al., "Sensemaking in the Enterprise: A Framework for Retrieving, Presenting, and Providing Feedback on Information Sources", SIGMOD Industrial Session Jun. 2008, ACM.org (online publication), USA.

Balahur et al., "Sentiment Analysis in the News", Proceedings of the Seventh Conference on International Language Resources and Evaluation, pp. 2216-2220, (online publication), URL: http://lexitron.nectec.or.th/public/LREC-2010_Malta/pdf/909_Paper.pdf.

Bejan et al., "Unsupervised Event Coreference Resolution With Rich Linguistic Features", Proceedings of the 48th Annual Meeting of the Association for Computational Linguistics, Jul. 2010, pp. 1412-1422, Association for Computational Linguistics, ACLWeb.org (online publication), URL: http://www.aclweb.org/anthology/P/P10/P10-1143.pdf.

Bhattacharya et al., "A Latent Dirichlet Model for Unsupervised Entity Resolution", In SIAM International Conference on Data Mining, Mar. 2006, pp. 1-12, LINQS Statistical Relational Learning Group @ UMD (online publication), URL: http://lings.cs.umd.edu/basilic/web/Publications/2006/bhattacharya:sdm06/bhattacharyasdm06.pdf.

Bagga et al., "A Methodology for Cross-Document Coreference", In Proceedings of the Fifth Joint Conference on Information Sciences (JCIS 2000), Feb. 27-Mar. 3, 2000, pp. 207-210, citeseerx.ist.psu.edu (online publication), URL: http://citeseerx.ist.psu.edu/viewdoc/download?doi=10.1.1.43.243&rep=rep1&type=pdf.

Elson et al., "Automatic Attribution of Quoted Speech in Literary Narrative", In Proceedings of the Twenty-Fourth AAAI Conference on Artificial Intelligence (AAAI 2010), Jul. 2010, pp. 1-7, Association for the Advancement of Artificial Intelligence (aaai.org), (online publication), URL: www.aaai.org/ocs/index.php/AAAI/AAAI10/paper/.../1945/2137.

Pouliquen et al., "Automatic Detection of Quotations in Multilingual News", In Proceedings of the International Conference Recent Advances in Natural Language Processing (RANLP'2007), Sep. 2007, pp. 487-492, CiteSeerx.ist.psu.edu (online publication), URL: http://citeseerx.ist.psu.edu/viewdoc/summary?doi=10.1.1.63.1807.

Sarmento et al., "Automatic Extraction of Quotes and Topics From News Feeds", In 4th Doctoral Symposium on Informatics Engineering (DSIE'09), Feb. 2009, pp. 1-12, Unversidade de Porto, Porto, Portugal (online publication), URL: http://dsie.fe.up.pt/site/docs/luissarmento/dsie09.pdf.

Bagga et al., "Cross-Document Event Coreference: Annotations, Experiments, and Observations", In Proceeding of the Workshop on Coreference and its Applications (ACL99), Jun. 1999, pp. 1-8, ACL Anthology (aclweb.org) (online publication), URL: www.aclweb.org/anthology-new/W/W99/W99-0201.pdf.

Bhattacharya et al., "Deduplication and Group Detection Using Links", The Tenth ACM SIGKDD International Conference on Knowledge Discovery and Data Mining (LinkKDD2004), Aug. 2004, pp. 1-10, ACM, Seattle WA.

Hasler et al., "Do Coreferential Arguments Make Event Mentions Coreferential?" Proceedings of the 7th Discourse Anaphora and Anaphor Resolution Colloquium (DAARC 2009), Nov. 2009, pp. 151-163, The Research Group in Computational Linguistics (online publication), URL: http://clg.wlv.ac.uk/papers/hasler-orasan-DAARC09.pdf.

De La Clergerie et al., "Extracting and Visualizing Quotations From News Wires", Proceedings of 4th Language & Technology Conference: Human Language Technologies as a Challenge for Computer Science and Linguistics, (LTC'09), Nov. 2009, pp. 1-5, INRIA Inventeurs Du Monde Numerique ("Inventors of the Digital World"), Poznan, Poland, (online publication), URL: http://pauillac.inria.fr/~pdenis/papers/ltc09.pdf.

Chen et al., "Graph-Based Event Coreference Resolution", Proceedings of the 2009 Workshop on Graph-based Methods for Natural Language Processing (ACL-IJCNLP 2009), Aug. 2009, pp. 54-57, ACL and AFNLP ,, Stroudsburg, Pennsylvania, USA.

Pouliquen et al., "Multilingual Multi-Document Continuously-Updated Social Networks", Proceedings of the Workshop Multi-source Multilingual Information Extraction and Summarization (MMIES'2007) held at RANLP'2007, Sep. 2007, pp. 25-32, European Commission Joint Research Center Institute for the Protection and Security of the Citizen (online publication), URL: http://langtech.jrc.it/Documents/0709_RANLP-MMIES_Social-Networks_BP-RS_long.pdf.

Balahur et al., "Opinion Mining on Newspaper Quotations", 2009 IEEE/WIC/ACM International Joint Conferences on Web Intelligence and Intelligent Agent Technologies, Sep. 2009, pp. 523-526, vol. 3, The Institute of Electrical and Electronics Engineers, Inc., USA.

Das et al., "Paraphrase Identification as Probabilistic Quasi-Synchronous Recognition", In Proceedings of the Joint Conference of the Annual Meeting of the Association for Computational Linguistics and the International Joint Conference on Natural Language Processing (ACL 2009), Aug. 2009, pp. 342-350, The Association for Computational Linguistics (ACL), Stroudsburg, Pennsylvania, USA.

Bhattacharya et al., "Relational Clustering for Multi-Type Entity Resolution", Proceedings of the Fourth International Work-shop on Multi-Relational Data Mining (MRDM-2005), Aug. 2005, pp. 3-12, ACM New York, USA.

* cited by examiner

EXTRACTING AND MINING OF QUOTE DATA ACROSS MULTIPLE LANGUAGES

BACKGROUND OF THE INVENTION

Field of the Invention

The field of the invention is data processing, or, more specifically, methods, apparatus, and products for extracting and mining of quote data across multiple languages.

Description of Related Art

With the proliferation of computers, mobile communications device, data communications networks, and other technologies, information is widely accessible. Such information can frequently include quotations from various commentators. For example, news services provide access to many stories that include quotations from people, businesses, political figures, and the like. Aggregating and making use of such information can prove to be difficult due, at least in part, to the volume of information available.

SUMMARY OF THE INVENTION

Methods, apparatuses, and products for extracting and mining of quote data across multiple languages, including: retrieving, from a plurality of quote sources, a plurality of commentary summarizations, wherein each commentary summarization is embodied as a machine-readable data structure and wherein the plurality of commentary summarizations include information in at least two or more languages; for each commentary summarization: identifying, within the commentary summarization, quote data, wherein the quote data represents a quote from a commentator; creating a quote tuple for the quote data, the quote tuple including information associated with quantifiable aspects of the quote data; and storing, in a quote tuple repository, the quote tuple; mining, for quote analysis information, the quote tuple repository; and presenting, to a user, the quote analysis information.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
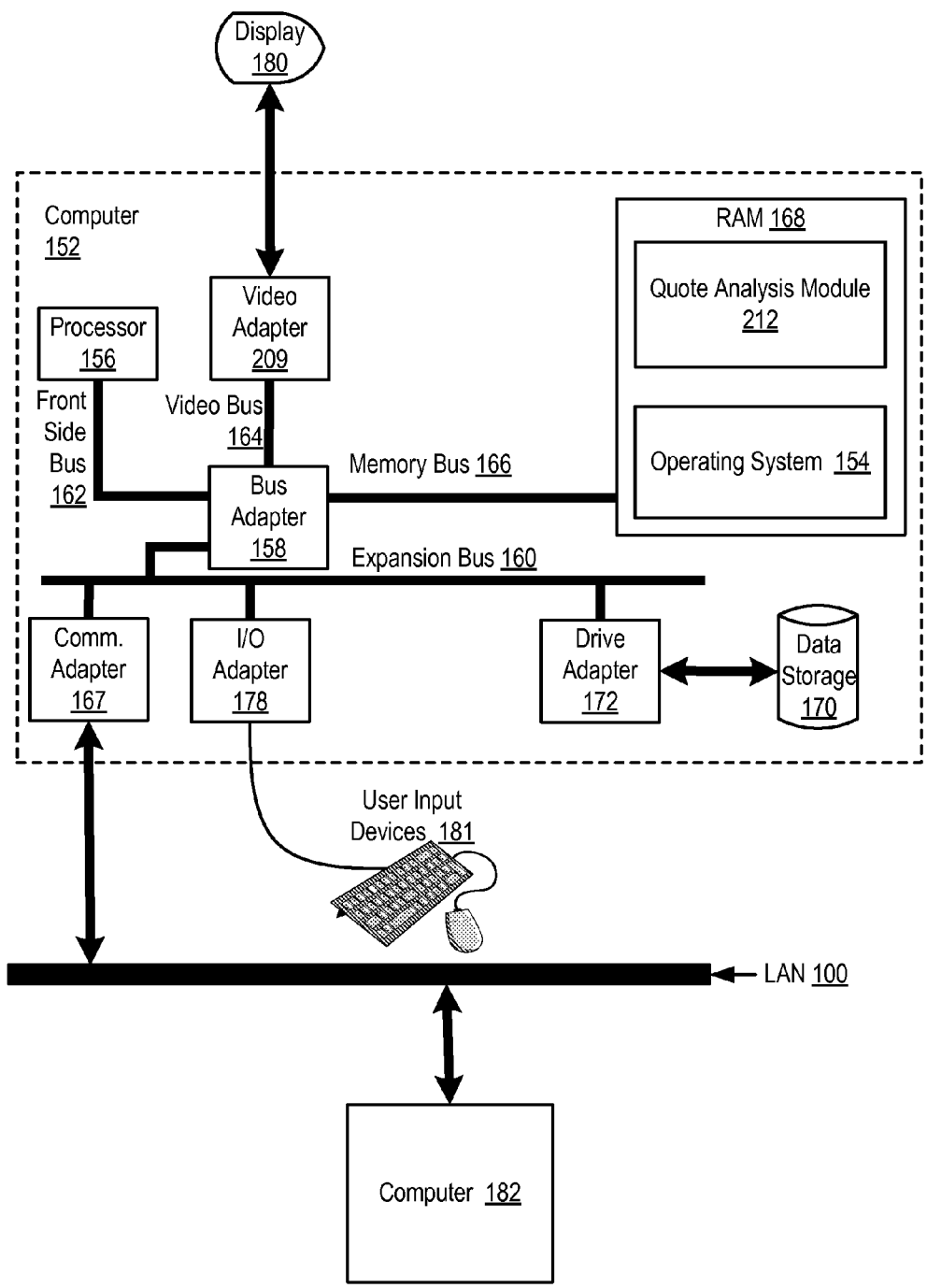
FIG. 1 sets forth a block diagram of automated computing machinery comprising an example computer useful in extracting and mining of quote data across multiple languages according to embodiments of the present invention.

Example methods, apparatus, and products for extracting and mining of quote data across multiple languages in accordance with the present invention are described with reference to the accompanying drawings, beginning with FIG. 1. FIG. 1 sets forth a block diagram of automated computing machinery comprising an example computer (152) useful in extracting and mining of quote data across multiple languages according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a quote analysis module (212), a module of computer program instructions improved for extracting and mining of quote data across multiple languages according to embodiments of the present invention. The quote analysis module (212) is depicted as being a single module but may include many modules of computer program instructions.

The quote analysis module (212) of FIG. 1 may carry out extracting and mining of quote data across multiple languages according to embodiments of the present invention by retrieving, from a plurality of quote sources, a plurality of commentary summarizations. Each quote source can include any entity that distributes content containing quotations from one or more individuals or entities. Examples of quote sources can include a news agency that distributes printed news stories, a news agency that delivers online news stories, a publisher that distributes magazines, a company that gathers and distributes opinions from registered users, and many others.

Quote sources may be accessible to the quote analysis module (212), for example, via a news wire that aggregates news stories, through the use of a web crawler or similar technology for searching online content posted by the quote sources, through the use of a technology that translates audio content containing quotations into a machine readable format, through the use of a technology that translates printed content into a machine readable format, and so on.

Each commentary summarization can include content that includes quotations from one or more individuals, quotations from a business entity in the form of a press release, or quotations from other entities. For example, a first commentary summarization can be generated based on a news article distributed by a news agency that includes quotations from one or more individuals as part of the news article. Similarly, a second commentary summarization can be generated based on a transcript from an interview conducted with a notable political figure. Each commentary summarization is embodied as a machine-readable data structure. For example, the commentary summarization may be embodied as a structured document, such as an extensible markup language ('XML') document, that includes quotations from a commentator, content from which the quotations was extracted (e.g., a news article), and so on. Such a structured document may also include metatdata identifying the source of the content contained in the commentary summarization, the time at which the content contained in the commentary summarization was generated, an identification of the particular people that are quoted in the content contained in the commentary summarization, an identification of the general topic of the content contained in the commentary summarization, and so on.

The plurality of commentary summarizations can include information in at least two or more languages. For example, a first commentary summarization can include a transcript of an interview conducted in English, as well as quotations that were given in the English language. Likewise, a second commentary summarization can include a transcript of an interview conducted in Spanish, as well as quotations that were given in the Spanish language. In such a way, the quote analysis module (212) can retrieve a plurality of commentary summarizations in different languages from a wide range of quote sources that operate in different countries and regions.

The quote analysis module (212) of FIG. 1 may further carry out extracting and mining of quote data across multiple languages according to embodiments of the present invention by identifying, within the commentary summarizations, quote data. The quote data represents a quote from a commentator. Identifying quote data within the commentary summarizations may be carried out, for example, by searching the content for indicators of a quotation such as quotation marks, phrases that indicate a quotation (e.g., President Obama was quoted as saying . . . ), and so on. In some embodiments, the commentary summarizations may be embodied as a structured document that includes tags for quotations. For example, a portion of the commentary summarizations may include the following structure:

<quote commentator="Franklin D. Roosevelt"> The only thing we have to fear is fear itself</quote>

In such an example, the structure of the commentary summarizations may be utilized to identify (216) quote data within the commentary summarizations.

The quote analysis module (212) of FIG. 1 may further carry out extracting and mining of quote data across multiple languages according to embodiments of the present invention by creating, in dependence upon the quote data, a quote tuple. The quote tuple includes information associated with quantifiable aspects of the quote data. The quote tuple can include, for example, the identity of the commentator that a quotation is attributed to, the content of the quotation itself, the time at which the quotation was made, and so on. Creating a quote tuple may be carried out by extracting such information from the commentary summarizations using natural language processing techniques and storing such information in the appropriate field, variable, or data structure within the quote tuple.

The quote analysis module (212) of FIG. 1 may further carry out extracting and mining of quote data across multiple languages according to embodiments of the present invention by storing, in a quote tuple repository, the quote tuple. The quote tuple repository may be embodied, for example, as a database such that each quote tuple is an entry in such a database. Identifying quote data, creating a quote tuple, and storing the quote tuple in a quote tuple repository is carried out for each commentary summarization. As such, upon carrying out the steps described above for a particular commentary summarization, the quote analysis module may determine whether there are additional commentary summarizations to be processed.

The quote analysis module (212) of FIG. 1 may further carry out extracting and mining of quote data across multiple languages according to embodiments of the present invention by mining, for quote analysis information, the quote tuple repository. The quote analysis information represents an assessment as to the content of the quotations. For example, the quote analysis information can include information identifying commentators that have been quoted on a particular topic, information identifying the historical quotations of a particular commentator on a particular topic, information identifying whether a commentator has a positive or negative view on a particular topic based on the commentator's quotations on the topic, and so on. Mining the quote tuple repository for quote analysis information may be carried out by searching the quote tuple repository for relevant entries and using natural language processing techniques to extract meaning from the relevant entries found in the quote tuple repository.

The quote analysis module (212) of FIG. 1 may further carry out extracting and mining of quote data across multiple languages according to embodiments of the present invention by presenting, to a user, the quote analysis information. Presenting the quote analysis information to the user may be carried out, for example, through the use of a graphical user interface ('GUI') that is accessible by the user. In the example method of FIG. 2, such a GUI may be presented to the user through a web browser on a desktop computer, through a special purpose GUI on a laptop computer, through an application on a mobile communications device, and so on.

Also stored in RAM (168) is an operating system (154). Operating systems useful extracting and mining of quote data across multiple languages according to embodiments of the present invention include UNIX™, Linux™, Microsoft XP™, AIX™, IBM's i5/OS™, and others as will occur to those of skill in the art. The operating system (154) and the quote analysis module (212) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for extracting and mining of quote data across multiple languages according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182), such as quotes sources, and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for extracting and mining of quote data across multiple languages according to embodiments of the present invention include modems for wired dial-up communications, Ethernet (IEEE 802.3) adapters for wired data communications network communications, and 802.11 adapters for wireless data communications network communications.

Figure 2:
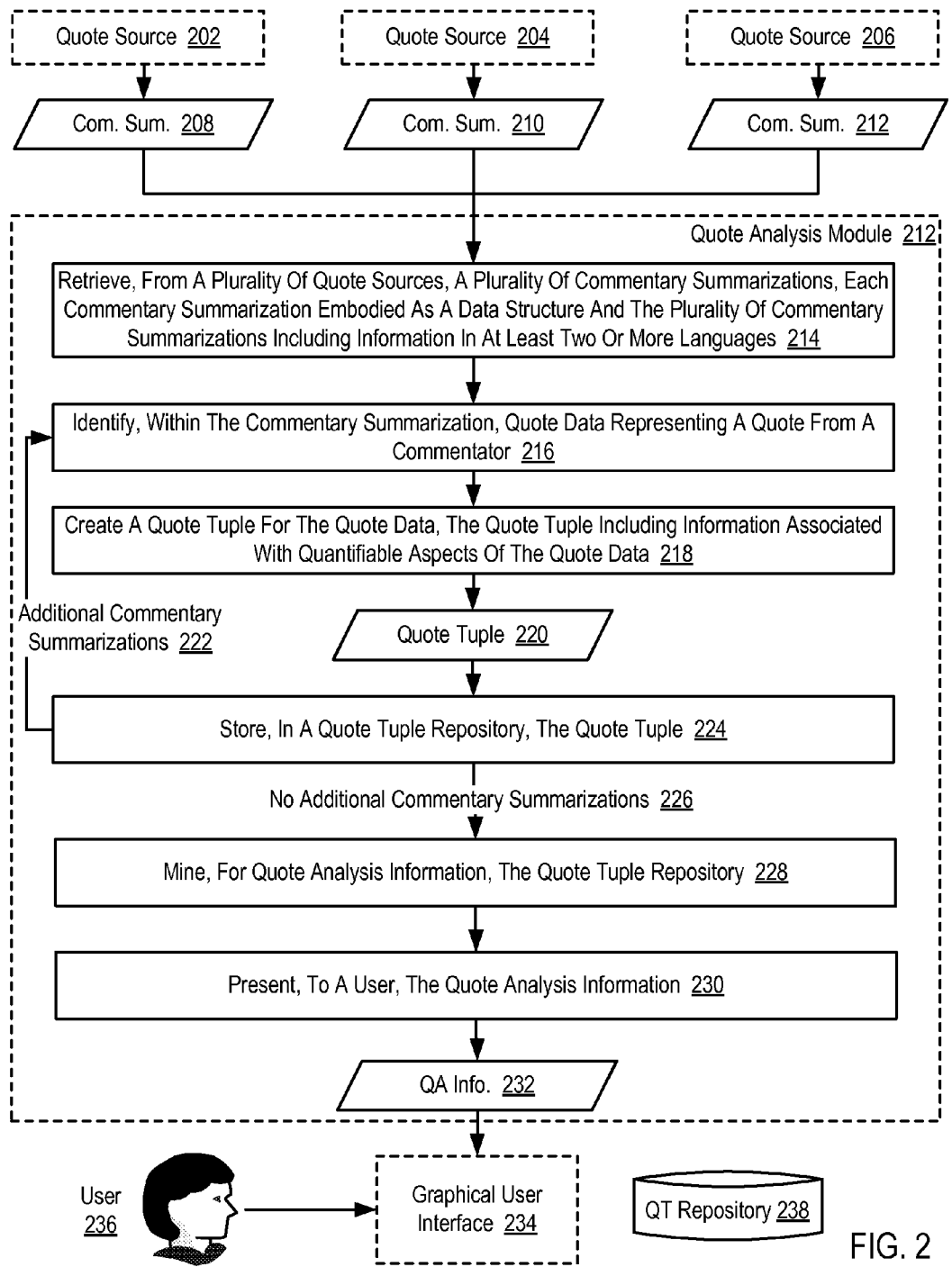
FIG. 2 sets forth a flow chart illustrating an example method for extracting and mining of quote data across multiple languages according to embodiments of the present invention.

For further explanation, FIG. 2 sets forth a flow chart illustrating an example method for extracting and mining of quote data across multiple languages according to embodiments of the present invention. The example method of FIG. 2 is depicted as being carried out, at least in part, by a quote analysis module (212). In the example method of FIG. 2, the quote analysis module (212) may be embodied as a module of computer program instructions executing on computer hardware, such as a computer processor. The quote analysis module (212) is depicted as being a single module but may include many modules of computer program instructions.

The example method of FIG. 2 includes retrieving (214), from a plurality of quote sources (202, 204, 206), a plurality of commentary summarizations (208, 210, 212). In the example method of FIG. 2, each quote source (202, 204, 206) can include any entity that distributes content containing quotations from one or more individuals or entities. Examples of quote sources (202, 204, 206) can include a news agency that distributes printed news stories, a news agency that delivers online news stories, a publisher that distributes magazines, a company that gathers and distributes opinions from registered users, and many others. Quote sources (202, 204, 206) may be accessible to the quote analysis module (212), for example, via a news wire that aggregates news stories, through the use of a web crawler or similar technology for searching online content posted by the quote sources (202, 204, 206), through the use of a technology that translates audio content containing quotations into a machine readable format, through the use of a technology that translates printed content into a machine readable format, and so on.

Each commentary summarization (208, 210, 212) of FIG. 2 can include content that includes quotations from one or more individuals, quotations from a business entity in the form of a press release, or quotations from other entities. For example, a first commentary summarization (208) can be generated based on a news article distributed by a news agency that includes quotations from one or more individuals as part of the news article. Similarly, a second commentary summarization (210) can be generated based on a transcript from an interview conducted with a notable political figure. In the example method of FIG. 2, each commentary summarization (208, 210, 212) is embodied as a data structure. For example, the commentary summarization (208, 210, 212) may be embodied as a structured document, such as an XML document, that includes quotations from a commentator, content from which the quotations was extracted (e.g., a news article), and so on. Such a structured document may also include metatdata identifying the source of the content contained in the commentary summarization (208, 210, 212), the time at which the content contained in the commentary summarization (208, 210, 212) was generated, an identification of the particular people that are quoted in the content contained in the commentary summarization (208, 210, 212), an identification of the general topic of the content contained in the commentary summarization (208, 210, 212), and so on.

In the example method of FIG. 2, the plurality of commentary summarizations (208, 210, 212) include information in at least two or more languages. For example, a first commentary summarization (208) can include a transcript of an interview conducted in English, as well as quotations that were given in the English language. Likewise, a second commentary summarization (210) can include a transcript of an interview conducted in Spanish, as well as quotations that were given in the Spanish language. In such a way, the quote analysis module (212) can retrieve (214) a plurality of commentary summarizations (208, 210, 212) in different languages from a wide range of quote sources (202, 204, 206) that operate in different countries and regions.

The example method of FIG. 2 also includes identifying (216), within the commentary summarizations (208, 210, 212), quote data. In the example method of FIG. 2, the quote data represents a quote from a commentator. Identifying (216) quote data within the commentary summarizations (208, 210, 212) may be carried out, for example, by searching the content for indicators of a quotation such as quotation marks, phrases that indicate a quotation (e.g., President Obama was quoted as saying . . . ), and so on. In some embodiments, the commentary summarizations (208, 210, 212) may be embodied as a structured document that includes tags for quotations. For example, a portion of the commentary summarizations (208, 210, 212) may include the following structure:

<quote commentator="Franklin D. Roosevelt"> The only thing we have to fear is fear itself</quote>

In such an example, the structure of the commentary summarizations (208, 210, 212) may be utilized to identify (216) quote data within the commentary summarizations (208, 210, 212).

The example method of FIG. 2 also includes creating (218), in dependence upon the quote data, a quote tuple (220). In the example method of FIG. 2, the quote tuple (220) includes information associated with quantifiable aspects of the quote data. The quote tuple (220) can include, for example, the identity of the commentator that a quotation is attributed to, the content of the quotation itself, the time at which the quotation was made, and so on. Creating (218) a quote tuple (220) may be carried out, for example, by extracting such information from the commentary summarizations (208, 210, 212) using natural language processing techniques and storing such information in the appropriate field, variable, or data structure within the quote tuple (220).

The example method of FIG. 2 also includes storing (224), in a quote tuple repository (238), the quote tuple (220). In the example method of FIG. 2, the quote tuple repository (238) may be embodied, for example, as a database such that each quote tuple (220) is an entry in such a database. In the example method of FIG. 2, identifying (216) quote data, creating (218) a quote tuple (220), and storing (224) the quote tuple (220) in a quote tuple repository (238) is carried out for each commentary summarization (208, 210, 212). As such, upon carrying out the steps described above for a particular commentary summarization (208), the quote analysis module (212) may determine whether there are additional commentary summarizations (210, 212) to be processed. In the example method of FIG. 2, if there are additional commentary summarizations (222) to process, execution of the method of FIG. 2 returns to step 216. If there are no additional commentary summarizations (226) to process, execution of the method of FIG. 2 continues to step 228.

The example method of FIG. 2 also includes mining (228), for quote analysis information (232), the quote tuple repository (238). In the example method of FIG. 2, the quote analysis information (232) represents an assessment as to the content of the quotations. For example, the quote analysis information (232) can include information identifying commentators that have been quoted on a particular topic, information identifying the historical quotations of a particular commentator on a particular topic, information identifying whether a commentator has a positive or negative view on a particular topic based on the commentator's quotations on the topic, and so on. In the example method of FIG. 2, mining (228) the quote tuple repository (238) for quote analysis information (232) may be carried out by searching the quote tuple repository (238) for relevant entries and using natural language processing techniques to extract meaning from the relevant entries found in the quote tuple repository (238).

The example method of FIG. 2 also includes presenting (230), to a user (236), the quote analysis information (232). In the example method of FIG. 2, presenting (230) the quote analysis information (232) to the user (236) may be carried out, for example, through the use of a graphical user interface ('GUI') (234) accessible by the user (236). In the example method of FIG. 2, such a GUI (234) may be presented to the user (236) through a web browser on a desktop computer, through a special purpose GUI on a laptop computer, through an application on a mobile communications device, and so on.

Figure 3:
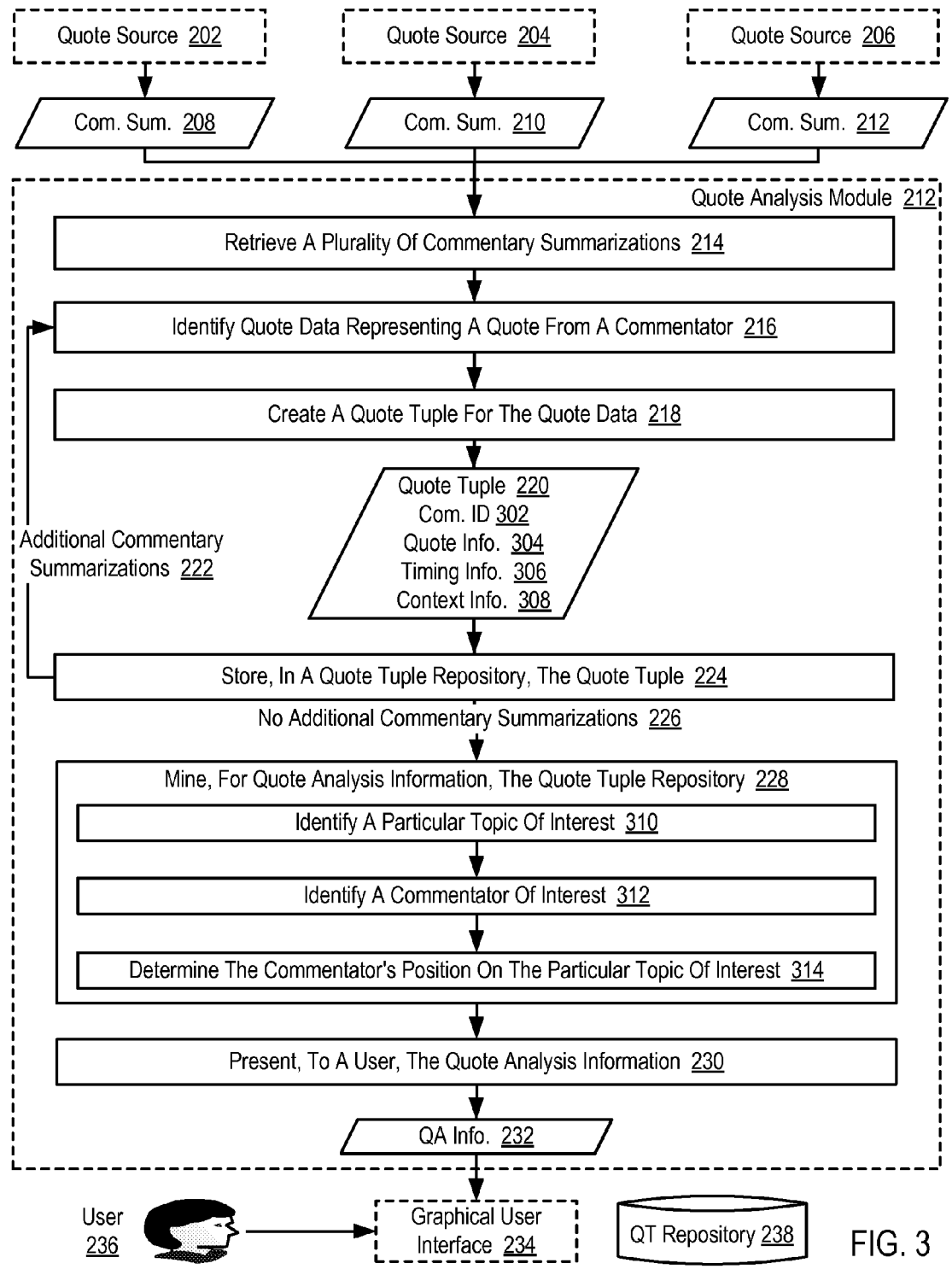
FIG. 3 sets forth a flow chart illustrating an additional example method for extracting and mining of quote data across multiple languages according to embodiments of the present invention.

For further explanation, FIG. 3 sets forth a flow chart illustrating an additional example method for extracting and mining of quote data across multiple languages according to embodiments of the present invention. The example method of FIG. 3 is similar to the example method of FIG. 2, as it also includes retrieving (214) a plurality of commentary summarizations (208, 210, 212), identifying (216) quote data, creating (218) a quote tuple (220), storing (224) the quote tuple (220) in a quote tuple repository (238), mining (228) the quote tuple repository (238) for quote analysis information (232), and presenting (230) the quote analysis information (232) to a user (236).

In the example method of FIG. 3, each quote tuple (220) includes information associated with an identity (302) of the commentator. The information associated with an identity (302) of the commentator can include any identifier that identifies the commentator that made a particular quote. The information associated with an identity (302) of the commentator can include, for example, the name of a person that made a quote, the username of a person that made a quote, the title (e.g., President, Chief Executive Officer, Analyst) of a person that made a quote, the name of a business organization that issued a quote, and so on.

In the example method of FIG. 3, information associated with an identity (302) of the commentator can be extracted from the content that contained the quote. Consider an example in which a commentary summarization (208) included textual content contained in a news article from a news agency. In such an example, the quote analysis module (212) may be configured to search the text of the news article and identify quotes contained therein, for example, by searching for indicators of a quote such as a quotation mark. Upon the discovery of a quotation, the quote analysis module (212) may be further configured to search the text surrounding the quotation for key phrases (e.g., was quoted as stating, stated that, said) suggesting that a quote is contributable to a particular person. In such a way, the quote analysis module (212) may be configured to extrapolate the identity of a commentator from the content that contained the quote. In alternative embodiments, the commentary summarization (208) may be embodied as a structured document, such that the identity (302) of the commentator can be identified by examining data within predefined tags that contains the commentator's identity, by examining predefined attributes within a tag that contains the commentator's identity, and so on.

In the example method of FIG. 3, information associated with an identity (302) of the commentator can alternatively be extracted from content related to the content that contained the quote. Consider an example in which a commentary summarization (208) included textual content contained in a news article from a news agency. In such an example, when the quote analysis module (212) cannot clearly identify the identity (302) of the commentator from the news article, the quote analysis module (212) may be configured to search the text of related news articles to determine the identity (302) of the commentator. For example, the quote analysis module (212) may be configured to identify a related news story from a different news agency and identify quotes contained therein by searching for indicators of a quote such as a quotation mark. Upon the discovery of a quotation in the related news story, the quote analysis module (212) may be further configured to compare the content of the quotation contained in the original news article to the content of the quotation contained in the related news article, determine that the content of the quotation contained in the original news article is related to the content of the quotation contained in the related news article, and determine that the commentator for each quote is identical. In such a way, the quote analysis module (212) may be configured to extrapolate the identity of a commentator from the related content that contained a related quote.

In the example method of FIG. 3, each quote tuple (220) also includes information (304) associated with a quote from the commentator. The information (304) associated with a quote from the commentator may include, for example, the text of the quote itself. In such an example, the information (304) associated with a quote from the commentator may be extracted from the content that contained the quote. Consider an example in which a commentary summarization (208) included textual content contained in a news article from a news agency. In such an example, the quote analysis module (212) may be configured to search the text of the news article and identify quotes contained therein, for example, by searching for indicators of a quote such as a quotation mark. Upon the discovery of a quotation, the quote analysis module (212) may be further configured to extract the text contained within the quotation marks and designate such text as information (304) associated with a quote from the commentator. In alternative embodiments, the commentary summarization (208) may be embodied as a structured document, such that the information (304) associated with a quote from the commentator can be identified, for example, by examining data within predefined tags that contains the quotation.

In the example method of FIG. 3, each quote tuple (220) also includes information (306) associated with a timing of the quote. The information (306) associated with a timing of the quote can include, for example, the time the quote was made, the date a quote was made, a relative time (e.g., three weeks ago) that the quote was made, and so on. In such an example, the information (306) associated with a timing of the quote can be extracted from the content that contained the quote. Consider an example in which a commentary summarization (208) included textual content contained in a news article from a news agency. In such an example, the quote analysis module (212) may be configured to search the text of the news article and identify dates contained therein. The quote analysis module (212) may be configured to search the text of the news article and identify dates contained therein, for example, by searching for indicators of a quote such as a quotation mark and subsequently searching the surrounding text for phrases (e.g., last week, on March 17$^{th}$, and so on). In addition, the quote analysis module (212) may be configured to search the text of the news article for data that is in the format of a date (e.g., XX/XX/XXXX) to identify the publication date of the article, which may be used as the date at which a quotation was attributed to a commentator. In alternative embodiments, the commentary summarization (208) may be embodied as a structured document, such that the information (306) associated with the timing of the quote can be identified, for example, by examining data within predefined tags that contains date information, by examining predefined attributes within a tag that contains date information, and so on.

In the example method of FIG. 3, each quote tuple (220) also includes information (308) associated with a context of the quote. In the example method of FIG. 3, information (308) associated with a context of the quote may include, for example, an identification of one more topics that the quotation is directed to, an indication of whether the commentator is making positive or negative comments on a particular topic, and so on. In the example method of FIG. 3, identifying the information (308) associated with a context of the quote may be carried out, for example, through the use of natural language processing techniques and natural language understanding techniques for assigning meaning by machines to human language input. In such an example, the quote analysis module (212) may be configured with, or otherwise have access to, natural language understanding sub-modules for implementing natural language understanding techniques. For example, the quote analysis module (212) may be configured with, or other otherwise have access to, a lexicon of the language, a parser, grammar rules to break sentences into internal representations, a semantic theory module to guide the comprehension of the component parts of human language input, and so on. In alternative embodiments, the commentary summarization (208) may be embodied as a structured document, such that the information (308) associated with a context of the quote can be identified, for example, by examining data within predefined tags that contains context information, by examining predefined attributes within a tag that contains context information, and so on.

In the example method of FIG. 3, mining (228) the quote tuple repository (238) for quote analysis information (232) can include identifying (310) a particular topic of interest. As described above, each quote tuple (220) may include information (308) associated with a context of the quote that includes an identification of the topic that a quote is related to. In such an example, the identification of the topic that a quote is related to may be embodied as a numerical value that represents an index into a listing of predetermined topics, as a string value that represents an index into a listing of predetermined topics, and so on. Identifying (310) a particular topic of interest may therefore be carried out by a user (236) entering a description of a topic, using such a description of a topic to identify an index into a listing of predetermined topics, and identifying all quote tuples (220) in a quote tuple repository (238) that are associated with the identified index into a listing of predetermined topics. Consider an example in which the quote analysis module (212) maintains, or otherwise has access to, the following listing of predetermined topics:

TABLE 1

Topics Table

| Topic Description | Topic ID |
|---|---|
| Chicago Bears Football | 1 |
| Chicago Cubs Baseball | 2 |
| Chicago Restaurants | 3 |
| Chicago Hotels | 4 |

The topics table described above includes a topic description and an identifier of such a topic. In such an example, quote tuples (220) generated in response to a quotation related to Chicago Bears Football may be assigned a topic identifier value of '1' in the information (308) associated with a context of the quote while quote tuples (220) generated in response to a quotation related to Chicago Cubs Baseball may be assigned a topic identifier value of '2' in the information (308) associated with a context of the quote. In order to identify (310) a particular topic of interest, a user (236) may be prompted to enter a description of a topic or be provided a list of available topics such that the topic identifier for the particular topic of interest can be identified. In such an example, the quote tuple repository (238) could subsequently be searched for tuples that are related to the particular topic of interest in order to retrieve quotations related to the particular topic of interest.

In the example method of FIG. 3, mining (228) the quote tuple repository (238) for quote analysis information (232) can also include identifying (312) a commentator of interest. As described above, each quote tuple (220) may include information associated with an identity (302) of the commentator that made a particular quote. In such an example, the identity (302) of the commentator that made a particular quote may be embodied as a numerical value that represents an index into a listing of predetermined commentators, as a string value that represents an index into a listing of predetermined commentators, and so on. Identifying (312) a commentator of interest may therefore be carried out by a user (236) entering a name or other description of a commentator, using such a description of a commentator to identify an index into a listing of predetermined commentators, and identifying all quote tuples (220) in the quote tuple repository (238) that are associated with the commentator of interest. Consider an example in which the quote analysis module (212) maintains, or otherwise has access to, the following listing of predetermined commentators:

TABLE 2

Commentators Table

| Commentator Description | Commentator ID |
|---|---|
| Chicago Tribune Newspaper | 1 |
| Hilary Clinton | 2 |
| Barack Obama | 3 |
| Michael Jordan | 4 |

The commentators table described above includes a commentator description and an identifier for each commentator. In such an example, quote tuples (220) generated in response to quotations made by Hilary Clinton may be assigned a commentator identifier value of '2' in the identity (302) of the commentator while quote tuples (220) generated in response to quotations made by Michael Jordan may be assigned a commentator identifier value of '4' in the identity (302) of the commentator. In order to identify (312) a commentator of interest, a user (236) may be prompted to enter a description of a commentator or be provided a list of available commentators such that the commentator identifier for the particular commentator of interest can be identified. In such an example, the quote tuple repository (238) could subsequently be searched for tuples that are related to the commentator of interest in order to retrieve quotations made by the commentator of interest.

In the example method of FIG. 3, mining (228) the quote tuple repository (238) for quote analysis information (232) can also include determining (314), for the commentator of interest, the commentator's position on the particular topic of interest. In the example method of FIG. 3, the commentator's position on the particular topic of interest represents an opinion, assessment, or other view held by the commentator on the particular topic of interest. For example, the commentator's position may include a commentator's evaluation that a stock is overpriced, a legislator's opinion that a particular piece of proposed legislation should be passed, a commentator's evaluation that an act committed by a company was unethical, and so on.

As described above, identifiers for both the commentator of interest and the topic of interest can be retrieved. In such an example, determining (314) the position of the commentator of interest on the particular topic of interest may be carried out by identifying all quote tuples (220) in the quote tuple repository (238) that are attributable to the commentator of interest and are also related to the particular topic of interest. In such an example, determining (314) the commentator's position on the particular topic of interest may therefore be carried out by applying natural language processing techniques and natural language understanding techniques to determine whether a quotation in each identified quote tuple (220) indicates that the commentator of interest is expressing a positive or negative opinion on the topic of interest. In such a way, the quote analysis module (212) may therefore determine whether a majority of the quotes made by the commentator of interest on the topic of interest are positive, negative, neutral, or represent some other opinion. In such an example, presenting (230) the quote analysis information (232) to a user (236) may therefore include presenting the user (236) with a count of positive quotes made by the commentator of interest on the topic of interest, presenting the user (236) with a count of negative quotes made by the commentator of interest on the topic of interest, presenting the user (236) with a percentage indicating what portion of quotes made by the commentator of interest on the topic of interest are positive or negative, and so on.

Figure 4:
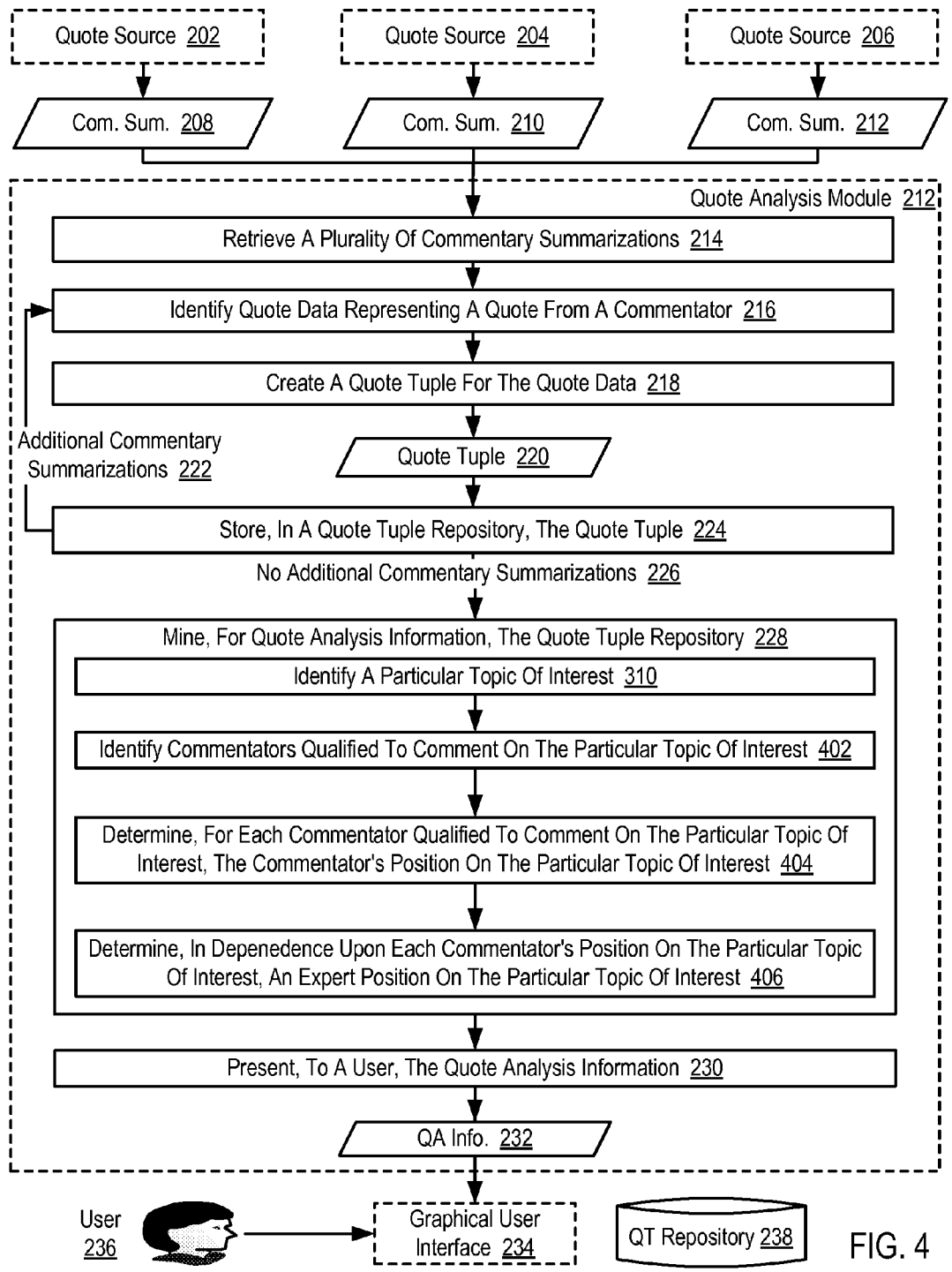
FIG. 4 sets forth a flow chart illustrating an additional example method for extracting and mining of quote data across multiple languages according to embodiments of the present invention.

For further explanation, FIG. 4 sets forth a flow chart illustrating an additional example method for extracting and mining of quote data across multiple languages according to embodiments of the present invention. The example method of FIG. 4 is similar to the example method of FIG. 2, as it also includes retrieving (214) a plurality of commentary summarizations (208, 210, 212), identifying (216) quote data, creating (218) a quote tuple (220), storing (224) the quote tuple (220) in a quote tuple repository (238), mining (228) the quote tuple repository (238) for quote analysis information (232), and presenting (230) the quote analysis information (232) to a user (236). In the example method of FIG. 4, mining (228) the quote tuple repository (238) for quote analysis information (232) can include identifying (310) a particular topic of interest. In the example method of FIG. 4, identifying (310) a particular topic of interest may be carried out as described above with reference to FIG. 3.

In the example method of FIG. 4, mining (228) the quote tuple repository (238) for quote analysis information (232) can also include identifying (402) commentators qualified to comment on the particular topic of interest. In the example method of FIG. 4, identifying (402) commentators qualified to comment on the particular topic of interest may be carried out, for example, by identifying commentators that most frequently comment on the particular topic of interest, by identifying commentators whose position (e.g., President of company A) indicates a level of knowledge on the particular topic of interest (e.g., the performance of company A), by identifying commentators that are affiliated with trusted organizations, by a user (236) assigning a trust level to a particular commentator on the particular topic of interest, and so on. In such a way, identifications of commentators qualified to comment on the particular topic of interest may be associated with an identifier of the topic of interest in a table, database, or other repository that is maintained, or otherwise accessible by, the quote analysis module (212).

In the example method of FIG. 4, mining (228) the quote tuple repository (238) for quote analysis information (232) can also include determining (404), for each commentator qualified to comment on the particular topic of interest, the commentator's position on the particular topic of interest. As described above, identifiers for both the commentator of interest and the topic of interest can be retrieved. In such an example, determining (404) the position of each commentator qualified to comment on the particular topic of interest may be carried out by identifying all quote tuples (220) in the quote tuple repository (238) that are related to the particular topic of interest and also attributable to the commentator qualified to comment on the particular topic of interest. In such an example, determining (404) the position of each commentator qualified to comment on the particular topic of interest may therefore be carried out by applying natural language processing techniques and natural language understanding techniques to determine whether a quotation in each identified quote tuple (220) indicates that the commentator qualified to comment on the particular topic of interest is expressing a positive or negative opinion on the topic of interest. In such a way, the quote analysis module (212) may therefore determine whether a majority of the quotes on the particular topic of interest that are made by each commentator qualified to comment on the particular topic of interest are positive, negative, or neutral.

In the example method of FIG. 4, mining (228) the quote tuple repository (238) for quote analysis information (232) can also include determining (406), in dependence upon each commentator's position on the particular topic of interest, an expert position on the particular topic of interest. In the example method of FIG. 4, the expert position on the particular topic of interest represents the cumulative position of each commentator qualified to comment on the particular topic of interest. In such an example, determining (406) an expert position on the particular topic of interest may therefore be carried out by applying an algorithm that takes into account the position of each commentator qualified to comment on the particular topic of interest. Such an algorithm may apply various weighting criteria such that the position of a first commentator qualified to comment on the particular topic of interest is more heavily weighted than a second commentator qualified to comment on the particular topic of interest. Similarly, the algorithm may take into account the extent to which each commentator qualified to comment on the particular topic of interest is positive or negative, such that a highly negative position by a first commentator qualified to comment on the particular topic of interest is more heavily weighted than a slightly positive position by a second commentator qualified to comment on the particular topic of interest. In such an example, presenting (230) the quote analysis information (232) to a user (236) may therefore include presenting the user (236) with a count of qualified commentators with a positive position on the topic of interest, presenting the user (236) with a count of qualified commentators with a negative position on the topic of interest, presenting the user (236) with a weighted average of the position of all qualified commentators on the topic of interest, and so on.

Figure 5:
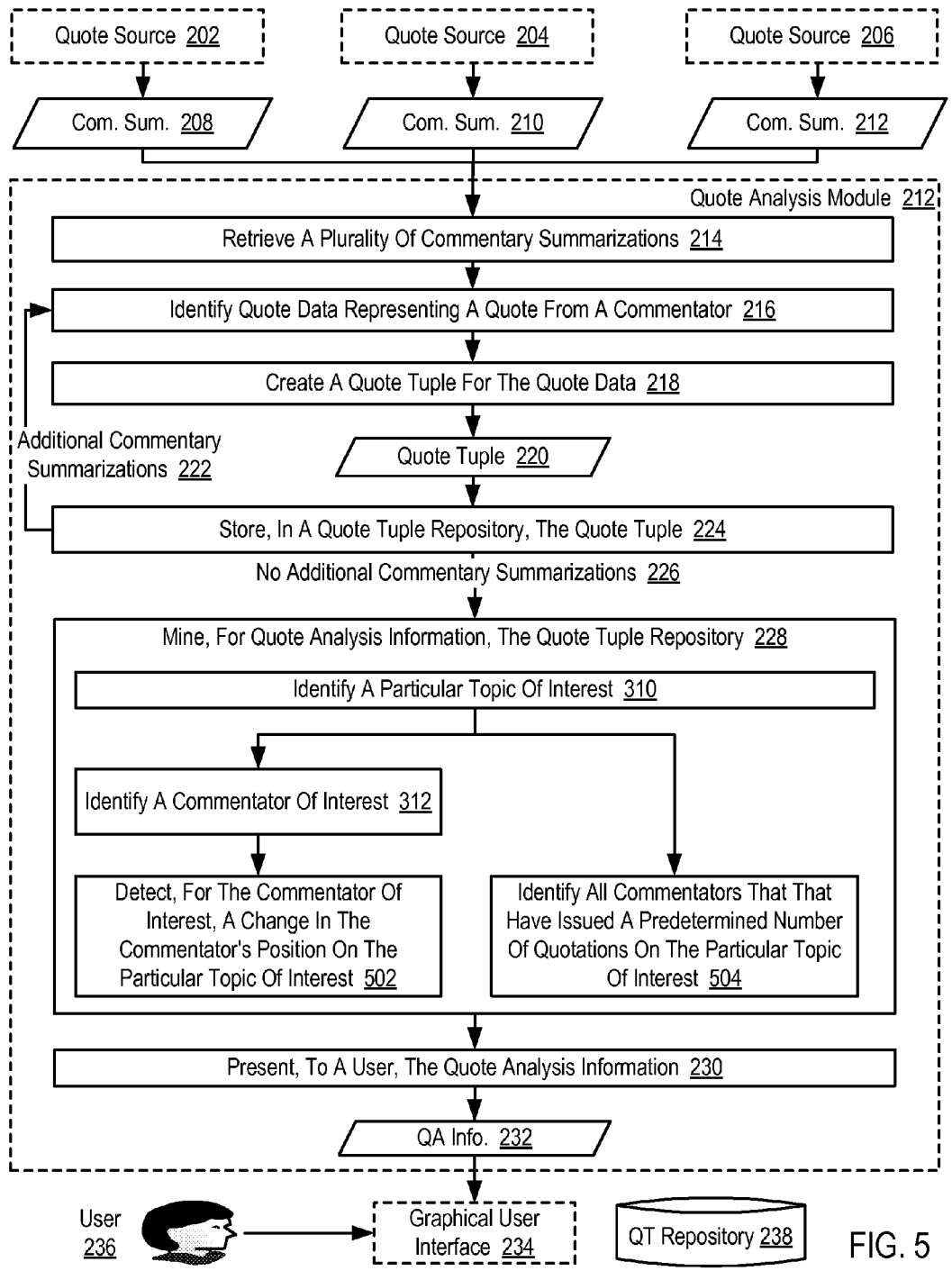
FIG. 5 sets forth a flow chart illustrating an additional example method for extracting and mining of quote data across multiple languages according to embodiments of the present invention.

For further explanation, FIG. 5 sets forth a flow chart illustrating an additional example method for extracting and mining of quote data across multiple languages according to embodiments of the present invention. The example method of FIG. 5 is similar to the example method of FIG. 2, as it also includes retrieving (214) a plurality of commentary summarizations (208, 210, 212), identifying (216) quote data, creating (218) a quote tuple (220), storing (224) the quote tuple (220) in a quote tuple repository (238), mining (228) the quote tuple repository (238) for quote analysis information (232), and presenting (230) the quote analysis information (232) to a user (236). In the example method of FIG. 5, mining (228) the quote tuple repository (238) for quote analysis information (232) can include identifying (310) a particular topic of interest and identifying a commentator of interest (312) as described above with reference to FIG. 3.

In the example method of FIG. 5, mining (228) the quote tuple repository (238) for quote analysis information (232) can also include detecting (502), for the commentator of interest, a change in the commentator's position on the particular topic of interest. In the example method of FIG. 5, detecting a change in the commentator's position on the particular topic of interest may be carried out, for example, by retaining information describing the commentator's position on the particular topic of interest as evidenced by each quotation made by the commentator of interest. In such a way, the quote analysis module (212) may be configured to examine a predetermined number of most recent quotations by the commentator of interest and determine whether the predetermined number of most recent quotations by the commentator of interest represent a position that is similar to a position expressed by historical quotations of the commentator of interest. Likewise, the quote analysis module (212) may be configured to examine a predetermined number of most recent quotations by the commentator of interest to determine which direction the commentator's position is trending on the particular topic of interest.

In the example method of FIG. 5, mining (228) the quote tuple repository (238) for quote analysis information (232) can also include identifying (504) all commentators that that have issued a predetermined number of quotations on the particular topic of interest. As described above, each quote tuple (220) in the quote tuple repository (238) may include an identifier of the commentator that made a particular quote and an identifier of the topic of the particular quote. In such a way, identifying (504) all commentators that that have issued a predetermined number of quotations on the particular topic of interest may be carried out by searching the quote tuple repository (238) for all entries associated with the identifier for the particular topic of interest. In such a way, the quote analysis module (212) may be configured to determine how many entries in the quote tuple repository (238) are associated with each commentator, such that commentators that that have issued a predetermined number of quotations on the particular topic of interest may be identified (504). In such a way, a user (236) may be presented with a list of active commentators that are issuing quotations on the particular topic of interest.

Readers will appreciate that the methods, apparatus, and products described above operate on a plurality of commentary summarizations that include information—such as quotations—in at least two or more languages. Readers will appreciate that natural language processing techniques and natural language understanding techniques can be applied to many languages, so long as a lexicon of the language, a parser, grammar rules to break sentences into internal representations, a semantic theory module to guide the comprehension of the component parts of human language input, and other modules exist for multiple languages. As such, by including or providing access to such modules configured for multiple languages, aspects of the present invention described above may be carried out without the need to translate a plurality of commentary summarizations that include information—such as quotations—in at least two or more languages.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for extracting and mining of quote data across multiple languages, the apparatus comprising a computer processor, a computer memory operatively coupled to the computer processor, the computer memory having disposed within it computer program instructions that, when executed by the computer processor, cause the apparatus to carry out the steps of:
   retrieving, from a plurality of quote sources, a plurality of commentary summarizations, wherein each commentary summarization is embodied as a machine-readable data structure and wherein the plurality of commentary summarizations include information in at least two or more languages;
   for each commentary summarization:
      identifying, within the commentary summarization, quote data, wherein the quote data represents a quote from a commentator;
      creating a quote tuple for the quote data, the quote tuple including information associated with quantifiable aspects of the quote data; and
      storing, in a quote tuple repository, the quote tuple;
   mining, for quote analysis information, the quote tuple repository, including:
      identifying a particular topic of interest;
      identifying a commentator of interest;
      determining, for the commentator of interest, the commentator's position on the particular topic of interest; and
      detecting, for the commentator of interest, a change in the commentator's position on the particular topic of interest including using natural language processing techniques to:
         examine a predetermined number of most recent quotations by the commentator of interest; and
         determine whether the predetermined number of most recent quotations by the commentator of interest represent a position that is similar to a position expressed by historical quotations of the commentator of interest; and
   presenting, to a user, the quote analysis information.

2. The apparatus of claim 1 wherein each quote tuple includes:
   information associated with an identity of the commentator;
   information associated with a quote from the commentator;
   information associated with a timing of the quote; and
   information associated with a context of the quote.

3. The apparatus of claim 1 wherein mining, for quote analysis information, the quote tuple repository further comprises:
- identifying commentators qualified to comment on the particular topic of interest;
- determining, for each commentator qualified to comment on the particular topic of interest, the commentator's position on the particular topic of interest; and
- determining, in dependence upon each commentator's position on the particular topic of interest, an expert position on the particular topic of interest.

4. The apparatus of claim 1 wherein mining, for quote analysis information, the quote tuple repository further comprises:
- identifying all commentators that that have issued a predetermined number of quotations on the particular topic of interest, thereby creating a list of active commentators that are issuing quotations on the particular topic of interest,
- and wherein the quote analysis information includes the list of active commentators that are issuing quotations on the particular topic of interest.

5. A computer program product for extracting and mining of quote data across multiple languages, the computer program product disposed upon a computer readable medium, wherein the computer readable medium is not a signal, the computer program product comprising computer program instructions that, when executed, cause a computer to carry out the steps of:
- retrieving, from a plurality of quote sources, a plurality of commentary summarizations, wherein each commentary summarization is embodied as a machine-readable data structure and wherein the plurality of commentary summarizations include information in at least two or more languages; for each commentary summarization:
  - identifying, within the commentary summarization, quote data, wherein the quote data represents a quote from a commentator;
  - creating a quote tuple for the quote data, the quote tuple including information associated with quantifiable aspects of the quote data; and
  - storing, in a quote tuple repository, the quote tuple;
- mining, for quote analysis information, the quote tuple repository, including:
  - identifying a particular topic of interest;
  - identifying a commentator of interest;
  - determining, for the commentator of interest, the commentator's position on the particular topic of interest; and
  - detecting, for the commentator of interest, a change in the commentator's position on the particular topic of interest including using natural language processing techniques to:
    - examine a predetermined number of most recent quotations by the commentator of interest; and
    - determine whether the predetermined number of most recent quotations by the commentator of interest represent a position that is similar to a position expressed by historical quotations of the commentator of interest; and
- presenting, to a user, the quote analysis information.

6. The computer program product of claim 5 wherein each quote tuple includes:
- information associated with an identity of the commentator;
- information associated with a quote from the commentator;
- information associated with a timing of the quote; and
- information associated with a context of the quote.

7. The computer program product of claim 5 wherein mining, for quote analysis information, the quote tuple repository further comprises:
- identifying commentators qualified to comment on the particular topic of interest;
- determining, for each commentator qualified to comment on the particular topic of interest, the commentator's position on the particular topic of interest; and
- determining, in dependence upon each commentator's position on the particular topic of interest, an expert position on the particular topic of interest.

8. The computer program product of claim 5 wherein mining, for quote analysis information, the quote tuple repository further comprises:
- identifying all commentators that that have issued a predetermined number of quotations on the particular topic of interest, thereby creating a list of active commentators that are issuing quotations on the particular topic of interest,
- and wherein the quote analysis information includes the list of active commentators that are issuing quotations on the particular topic of interest.

9. The computer program product of claim 5 wherein the computer readable medium comprises a storage medium.

* * * * *